(12) United States Patent
Richter et al.

(10) Patent No.: US 8,474,137 B2
(45) Date of Patent: Jul. 2, 2013

(54) METHOD FOR REPAIRING TURBINE BLADES

(75) Inventors: Karl-Hermann Richter, Markt Indersdorf (DE); Klaus Emiljanow, Sehnde (DE)

(73) Assignee: MTU Aero Engines GmbH, Munich (DE)

( * ) Notice: Subject to any disclaimer, the term of this patent is extended or adjusted under 35 U.S.C. 154(b) by 946 days.

(21) Appl. No.: 12/307,497

(22) PCT Filed: Jul. 11, 2007

(86) PCT No.: PCT/DE2007/001227
§ 371 (c)(1),
(2), (4) Date: Sep. 29, 2009

(87) PCT Pub. No.: WO2008/009267
PCT Pub. Date: Jan. 24, 2008

(65) Prior Publication Data
US 2010/0074755 A1 Mar. 25, 2010

(30) Foreign Application Priority Data
Jul. 19, 2006 (DE) .................. 10 2006 033 799

(51) Int. Cl.
*B23P 6/00* (2006.01)
(52) U.S. Cl.
USPC ................ 29/889.1; 29/889.21; 29/889.7

(58) Field of Classification Search
USPC ................ 29/889.1, 889.2, 889.21, 889.23, 29/889.7, 889.71; 416/223 R
See application file for complete search history.

(56) References Cited

U.S. PATENT DOCUMENTS

| 3,802,046 | A | 4/1974 | Wachtell et al. |
| 5,444,911 | A | 8/1995 | Goodwater et al. |
| 5,701,669 | A * | 12/1997 | Meier ................ 29/889.1 |
| 5,873,703 | A | 2/1999 | Kelly et al. |
| 5,913,555 | A | 6/1999 | Richter et al. |
| 2005/0091848 | A1 | 5/2005 | Nenov et al. |
| 2007/0084047 | A1 | 4/2007 | Lange et al. |

FOREIGN PATENT DOCUMENTS
JP 09168927 6/1997

* cited by examiner

*Primary Examiner* — David Bryant
*Assistant Examiner* — Ryan J Walters
(74) *Attorney, Agent, or Firm* — Greer, Burns & Crain, Ltd.

(57) ABSTRACT

A method for repairing turbine blades by replacing at least a part of the blade profile, the method having: a) manufacture of a replacement blade part; b) separation of the damaged area with a standardized cutting plane, leaving behind a remaining blade; c) matching of the replacement blade part to the actual geometry of the remaining blade; d) connecting or joining of the replacement blade part to the remaining blade by soldering of at least one web and welding of an outer contour.

8 Claims, 3 Drawing Sheets

METHOD FOR REPAIRING TURBINE BLADES

The present invention relates to a method for repairing turbine blades. Damages to turbine blades, in particular to high-pressure turbine blades, that occur below the area of the blade tip can currently be repaired only to a limited extent. These limitations relate in particular to the overall crack length and crack position. Due to the demands on joining quality, methods that may be used to attach a replacement part include in particular diffusion bonding (soldered connections) and beam welding, such as for example bonds produced using arc welding or electron beam welding. Both methods have disadvantages; for example, if beam welding is used the inner walls cannot be bonded. In the case of diffusion soldering, bonding errors may occur that are difficult to detect.

United States patent application US 2005/0091848 A1 describes a method for manufacturing and repairing turbine blades. Here, the method for repairing turbine blades includes the removal of the blade tip cap and of a segment of the blade profile from the turbine blade in order to form a repair surface on the blade profile. A replacement blade tip is then manufactured that has a replacement blade tip and a replacement blade segment that are matched to the surface that is to be repaired. Finally, the replacement tip segment is connected to the repair surface. The connection between the replacement part and the repair surface takes place using either thermal or thermomechanical diffusion bonding, high-temperature soldering, or welding.

Here as well, the above-named disadvantages in the bonding of the replacement part to the repair surface are not avoided.

The object of the present invention is therefore to provide a method for repairing turbine blades that avoids the disadvantages of the prior art. In particular, the repairability of damaged high-pressure turbine blades is to be increased, preferably to a significant degree.

The method according to the present invention for repairing turbine blades, in particular high-pressure turbine blades of gas turbines, by replacing at least a part of the blade profile has the following steps:
a) production of a replacement blade part as a cast part;
b) separation of the damaged area with a standardized cutting plane, leaving behind a remaining blade;
c) matching of the replacement blade part to the actual geometry of the remaining blade;
d) joining of the replacement blade part to the remaining blade using a combination of soldering, in particular high-temperature soldering, and welding, in particular beam welding.

This provides a method for repairing turbine blades that avoids the disadvantages of the prior art. In particular, the repairability of damaged high-pressure turbine blades is significantly increased, and the life span of the repair parts is thus significantly improved.

In an advantageous development, after the soldering, in particular high-temperature soldering, and after the welding, in particular beam welding, there takes place a post— and/or final treatment (step e)); here, for example steps such as heat treatment, mechanical processing and/or boring, etc., may be carried out. In addition, it can be provided that subsequently, i.e. in particular after step d) or after step e) (if step e) is present), the repaired turbine blade is tested (step f)).

For example, as a result of the casting process and the operation of the turbine blades, in particular high-pressure turbine blades, in the engine, the target contour may deviate significantly from the actual contour of the turbine blades that are to be repaired. Therefore, in method step c) the replacement blade part is adapted to the actual geometry of the remaining blade. In particular, it can be provided that in step c) it is ensured that at the cut point the inner and outer contour of the replacement part, i.e. of the replacement blade part, agree with the inner and outer contour of the remaining blade. In addition, in an advantageous construction it is ensured that the transition from the remaining blade to the replacement part is continuous, i.e., discontinuous changes in the inner and outer contour are avoided.

These requirements can be met for example as follows:
manufacture, preferably by casting, of a replacement part having excess material on the inner and outer contour. In an advantageous construction, the excess is selected such that all, or at least a large part, of the real actual contours are "covered" at the surface of the remaining blade that is to be joined;
acquisition of the actual geometry of the surface that is to be joined of the remaining blade, for example using image processing or other methods such as molding or the like;
automated or manual matching of the replacement part to the actual geometry of the remaining blade. At the cut point, in an advantageous construction the outer and inner contour of the remaining blade and of the replacement part should agree. Because the transition between them should preferably be continuous, in an advantageous development the contour of the replacement part is matched using interpolation.

Another possible method for manufacturing the replacement part is what is known as selective laser melting (SLM). This method makes it possible to produce a custom-cut replacement part on the basis of the measurement of the actual contour of the remaining blade. However, this method requires finishing, i.e. a final processing of the outer contour.

In method step d), a combined joining method is indicated, because the exclusive use of a single joining method, for example diffusion soldering or beam welding, has disadvantages. Therefore, the methods of soldering, in particular high-temperature soldering, and welding, in particular beam welding, are used in combination. This may for example be realized as follows:

First, high-temperature soldering is carried out. For this purpose, a suitable solder whose remelt temperature is greater than the operating temperature is used to solder either the entire cut point or only the webs that separate the individual chambers, in particular those situated inside the blade or remaining blade or replacement part. The soldering can for example take place using a solder preform and/or using PVD coating and/or using paste.

After the soldering, the high-temperature soldering takes place for example in a vacuum oven or inductively under a protective gas atmosphere. Subsequently, at least the inner contour is joined, and, if warranted, both the inner and outer contour are joined.

The joining of the outer contour takes place by welding, preferably beam welding. If the outer contour has already been joined by soldering, in particular high-temperature soldering, the solder seam is "welded over."

The welding, in particular beam welding, is preferably carried out using a laser. A possible variation is butt welding, possibly with (e.g. inductive) preheating of the join zone. Another variant is joining by build-up welding. For this purpose, the parts that are to be joined are beveled at the outer contour in a V-shape or with an angle $\Phi$ that is for example 45°, but that may also have a different construction. Subsequently, build-up welding is used to fill the V-shaped gap with additional material such as powder or wire, thus creating a bond between the additional material, the replacement part, and the remaining blade. In this variant, preheating, in particular inductive preheating, may also be used. The additional material, in the form of powder or wire, may be either of the same type as the material of the parts being joined or of a different type. If an additional material of a different type is used, this may have a positive influence on the metallurgical properties or suitability for welding of the bond.

Due to the high demands made on the component, in method step f) there preferably takes place a 100% testing of the join zone after the repair has been carried out. This testing is preferably carried out by means of computer tomography, using a line detector.

Finally, according to the present invention a turbine blade is provided that is manufactured according to one of the methods named above.

In the following, examples of the present invention are described on the basis of the description of the accompanying Figures and on the basis of exemplary embodiments.

In the following, identical or similar components have been provided with identical reference characters.

Figure 1:
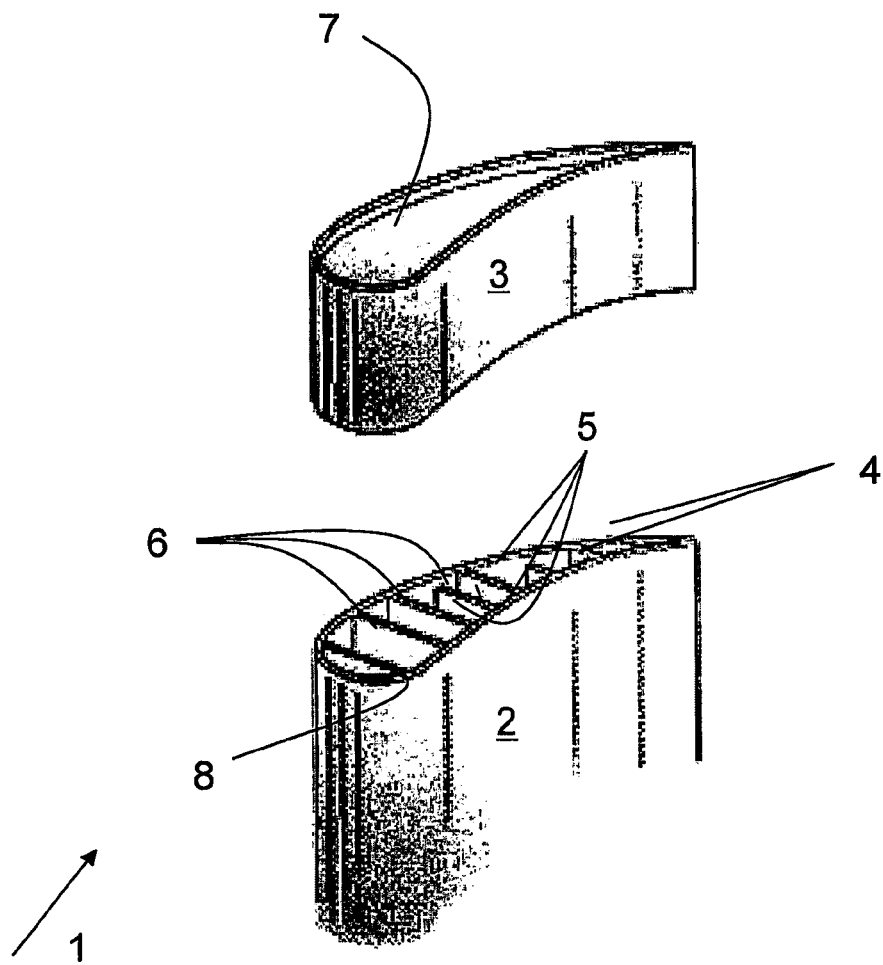
FIG. 1 shows a perspective representation of a remaining blade, and a fitting replacement part above it.

FIG. 1 shows a perspective view of a turbine blade 1. The representation in FIG. 1 shows in the lower area a corresponding remaining blade 2 that has already been separated from the damaged blade tip part. The separation of the damaged blade tip from the remaining blade 2 takes place along a standardized cutting plane 4. Turbine blade 1 is hollow in its construction, and webs 5 are present in its interior by means of which chambers 6 are formed, which can be seen clearly in the area of remaining blade 2 in FIG. 1.

Above remaining blade 2 a replacement blade part 3 with blade tip 7 is shown.

Replacement blade part 3 is matched to the actual geometry of remaining blade 2; i.e., outer contour 8 of remaining blade 2 agrees with outer contour 8 of replacement blade part 3.

The steps for repair of a high-pressure turbine blade shown as an example in FIG. 1, by replacing a damaged blade part, are carried out according to this exemplary embodiment as follows:
a) Manufacture by casting of a replacement blade part 3
b) Separation of the damaged area from the turbine blade that is to be repaired, corresponding to a standardized cutting plane 4
c) Matching of replacement blade part 3 to the actual geometry of remaining blade 2; this step requires particular attentiveness. This is because the operation of the high-pressure turbine blade in the jet engine may cause the target contour to differ significantly from the actual contour of the turbine blade that is to be repaired. For this reason, replacement blade part 3 is manufactured so as to have excess material on its inner and outer contour. Here, the excess material must be selected such that all, or most of, the real actual contours can be covered on the surface of remaining blade 2 that is to be joined. After corresponding matching of the replacement blade part to the actual contour of remaining blade 2, in particular taking care that no discontinuous changes arise in the inner and outer contour, the next method step is carried out.
d) The repaired turbine blade is produced by joining the replacement blade part to remaining blade 2. The joining step takes place using a combination of diffusion (soldering) bonding and beam welding. The diffusion joining or soldering can for example be carried out at first as high-temperature soldering, in which, using a suitable solder, either the entire cut point or only webs 5 that separate individual chambers 6 from one another are soldered. This soldering takes place either using a solder preform, using PVD coating, or using paste. After this soldering, high-temperature soldering takes place either in a vacuum oven or inductively in a protective gas atmosphere. Subsequently, the inner contour is joined, together with the outer contour if warranted. The joining of the outer contour takes place using beam welding. If outer contour 8 has already been joined using high-temperature soldering, the solder seam is "welded over."

Figure 2:
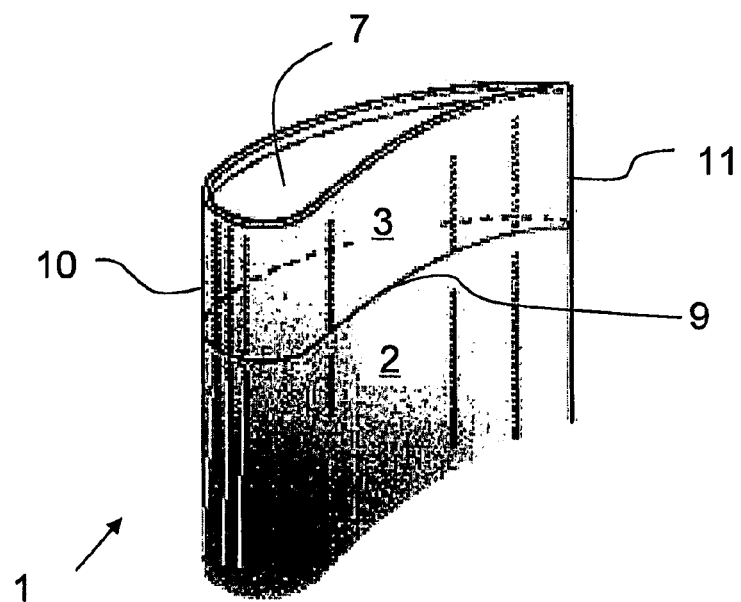
FIG. 2 shows the remaining blade with the replacement part joined thereto.

A turbine blade repaired in this way is shown in a perspective view in FIG. 2.

Here, weld seam 9, connecting remaining blade 2 to replacement blade part 3 having blade tip 7, is clearly visible. From blade front edge 10 up to blade rear edge 11, turbine blade 1 is free of discontinuous transitions that would have an adverse effect on the functioning of the repaired turbine blade, in particular on its aerodynamic properties.

Figure 3:
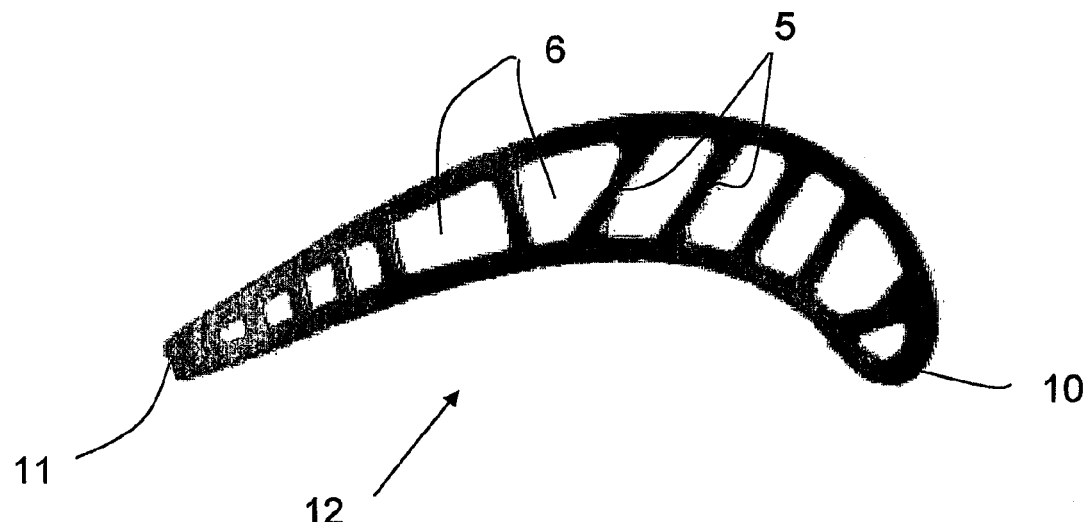
FIG. 3 shows a solder preform part, cut by a laser beam, in section.

FIG. 3 shows a section through solder preform 12 mentioned above, which agrees congruently with outer contour 8 of remaining blade 2 from blade front edge 10 up to blade rear edge 11. In addition, the corresponding webs 5 and chambers 6 are fashioned so as to be identical to webs 5 and chambers 6 that are present opposite them in remaining blade 2. Here as well, the cutting plane enables replacement blade part 3 to be joined to remaining blade 2 with a precise fit.

Figure 4:
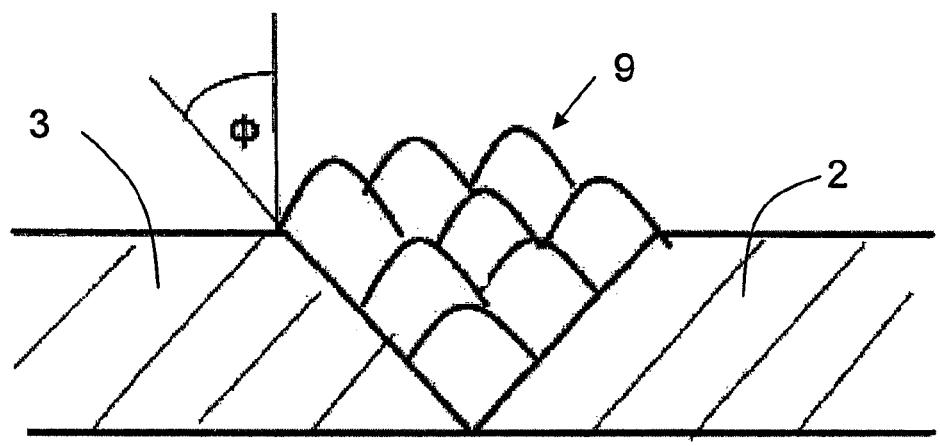
FIG. 4 shows a schematic detailed representation of the joining of the outer contour through build-up welding, with a V-shaped gap.

Finally, FIG. 4 shows another specific embodiment of a welded bond using build-up welding. For this purpose, the parts that are to be joined, remaining blade 2 and replacement blade part 3, are beveled on their outer contour with an angle Φ, typically 45°. Subsequently, build-up welding is used to fill the V-shaped gap with additional material such as powder or wire, creating a bond between the additional material, replacement blade part 3, and remaining blade 2. If warranted, preheating, in particular inductive preheating, may also be used in this variant. The additional material, in the form of powder or wire, may either be of the same type or of a different type. The use of an additional material of a different type may have a positive influence on the metallurgical properties or suitability for welding of the bond.

The realization of the present invention is not limited to the preferred exemplary embodiments indicated above. Rather, a number of variants are conceivable that make use of the solution presented in embodiments having fundamentally different constructions.

The invention claimed is:

1. A method for repairing turbine blades by replacing at least a part of the blade profile, the method comprising:
   a) manufacturing a replacement blade part including a plurality of webs;
   b) separating a damaged area of a blade with a standardized cutting plane, leaving behind a remaining blade including a plurality of webs;
   c) matching of the replacement blade part to the actual geometry of the remaining blade;

d) connecting or joining of the replacement blade part to the remaining blade by high temperature soldering of at least two of the webs of the replacement part and the remaining blade together and beam welding of an outer contour associated with the replacement part and the remaining blade.

2. The method as recited in claim 1, further comprising step (e) final processing of the repaired turbine blade.

3. The method as recited in claim 2, further comprising step (f) a testing of the repaired turbine blade following step (e).

4. The method for repairing turbine blades as recited in claim 2, wherein after the beam welding and the high-temperature soldering of the replacement part to the remaining blade, a joining of the outer contour to the remaining blade is performed using additional beam welding.

5. The method for repairing turbine blades as recited in claim 2, wherein the beam welding includes one of laser welding, butt welding, or joining by build-up welding.

6. The method for repairing turbine blades as recited in claim 1, wherein the replacement blade part is produced with excess material on the inner and outer contour.

7. The method for repairing turbine blades as recited in claim 6, further comprising acquiring an actual geometry of a surface of the remaining blade that is joined with the replacement blade part.

8. The method for repairing turbine blades as recited in patent claim 1, the replacement blade part being manufactured using the SLM method.

\* \* \* \* \*